(12) United States Patent
Liu

(10) Patent No.: US 12,058,184 B2
(45) Date of Patent: Aug. 6, 2024

(54) SCREEN CONTROL METHOD AND APPARATUS

(71) Applicant: VIVO MOBILE COMMUNICATION CO., LTD., Dongguan (CN)

(72) Inventor: Ruochu Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/993,867

(22) Filed: Nov. 23, 2022

(65) Prior Publication Data

US 2023/0093481 A1 Mar. 23, 2023

Related U.S. Application Data

(63) Continuation of application No. PCT/CN2021/095344, filed on May 21, 2021.

(30) Foreign Application Priority Data

May 28, 2020 (CN) .......................... 202010469518.5

(51) Int. Cl.
  *H04L 65/1094* (2022.01)
  *H04L 65/403* (2022.01)
  *H04N 7/15* (2006.01)

(52) U.S. Cl.
  CPC ...... *H04L 65/1094* (2022.05); *H04L 65/4046* (2013.01); *H04N 7/152* (2013.01)

(58) Field of Classification Search
  CPC ............. H04L 65/1094; H04L 65/1095; H04L 65/4046; H04N 7/152
  See application file for complete search history.

(56) References Cited

U.S. PATENT DOCUMENTS

| | | | | | |
|---|---|---|---|---|---|
| 5,473,367 | A | * | 12/1995 | Bales | H04N 7/152 348/E7.083 |
| 7,978,838 | B2 | * | 7/2011 | Rodman | H04N 7/152 704/270.1 |

(Continued)

FOREIGN PATENT DOCUMENTS

| | | |
|---|---|---|
| CN | 102123267 A | 7/2011 |
| CN | 105743764 A | 7/2016 |

(Continued)

OTHER PUBLICATIONS

International Search Report issued in corresponding International Application No. PCT/CN2021/095344, mailed Aug. 25, 2021, 4 pages.

(Continued)

*Primary Examiner* — Nam T Tran
(74) *Attorney, Agent, or Firm* — IPX PLLC

(57) ABSTRACT

A screen control method and an apparatus are provided. The method includes: in a case that a screen of multi-party video communication is displayed, receiving a first input by a first user; and in response to the first input, establishing a first communication connection between a first electronic device and a second electronic device. Both the first electronic device and the second electronic device are electronic devices participating in the multi-party video communication. The first communication connection is used to transmit a control instruction of the second electronic device on a screen display content of the first electronic device. In a case that the control instruction is received, a control operation corresponding to the control instruction is performed on the screen display content of the first electronic device.

14 Claims, 14 Drawing Sheets

(56) References Cited

U.S. PATENT DOCUMENTS

| | | | | |
|---|---|---|---|---|
| 2006/0020665 A1* | 1/2006 | Hagale | ............... | H04L 65/4046 |
| | | | | 709/204 |
| 2009/0254839 A1* | 10/2009 | Kripalani | ............... | H04N 7/152 |
| | | | | 709/204 |
| 2011/0175977 A1* | 7/2011 | Dahl | ................... | H04L 65/1094 |
| | | | | 348/E7.083 |
| 2015/0341570 A1 | 11/2015 | Jaynes | | |

FOREIGN PATENT DOCUMENTS

| CN | 107147667 A | 9/2017 |
|---|---|---|
| CN | 107623833 A | 1/2018 |
| CN | 111752449 A | 10/2020 |
| KR | 20170025273 A | 3/2017 |

OTHER PUBLICATIONS

Extended European Search Report issued in related European Application No. 21812900.5, mailed Sep. 22, 2023, 10 pages.

\* cited by examiner

SCREEN CONTROL METHOD AND APPARATUS

CROSS-REFERENCE TO RELATED APPLICATIONS

The present application is a continuation of International Application No. PCT/CN2021/095344, filed on May 21, 2021, which claims priority to Chinese Patent Application No. 202010469518.5, filed on May 28, 2020. The entire contents of each of the above-identified applications are expressly incorporated herein by reference.

TECHNICAL FIELD

The present application relates to the field of communications technologies, and in particular, to a screen control method and an apparatus.

BACKGROUND

Currently, in multi-party video communication between electronic device users, for example, a remote conference and distance learning, a screen is usually controlled by a main control device, and a user of the main control device operates a screen display content.

If the main control device wants to allow a user of another sub control device to operate the screen display content, for example, turning to a next slide of a Power Point presentation, one method is to have a voice call with the user of the sub control device, and then the user of the main control device performs an operation; and another method is to inform the user of the sub control device of the user name and password of the user of the main control device, so that the user of the sub control device can log in to the main control device remotely through the user name and password for performing an operation. These two methods are relatively complicated and inconvenient.

SUMMARY

Embodiments of the present application provide a screen control method and an apparatus.

According to a first aspect, an embodiment of the present application provides a screen control method, applied to a first electronic device and including:

in a case that a screen of multi-party video communication is displayed, receiving a first input by a first user;

in response to the first input, establishing a first communication connection between the first electronic device and a second electronic device corresponding to the first input, where both the first electronic device and the second electronic device are electronic devices participating in the multi-party video communication; and the first communication connection is used to send a control instruction of the second electronic device on a screen display content of the first electronic device; and in a case that the control instruction is received, performing a control operation corresponding to the control instruction on the screen display content of the first electronic device.

According to a second aspect, an embodiment of the present application further provides a screen control method, applied to a second electronic device and including:

in a case that a screen of multi-party video communication is displayed, receiving a control operation by a second user on the second electronic device, where electronic devices participating in the multi-party video communication at least include a first electronic device and the second electronic device; and in a case that a first communication connection is established between the second electronic device and the first electronic device, in response to the control operation, sending a control instruction corresponding to the control operation to the first electronic device through the first communication connection, where the first communication connection is used to transmit the control instruction of the second electronic device on a screen display content of the first electronic device.

According to a third aspect, an embodiment of the present application provides a screen control apparatus, applied to a first electronic device and including:

a first receiving module, configured to, in a case that a screen of multi-party video communication is displayed, receive a first input by a first user;

a first connection module, configured to, in response to the first input, establish a first communication connection between the first electronic device and a second electronic device corresponding to the first input, where both the first electronic device and the second electronic device are electronic devices participating in the multi-party video communication; and the first communication connection is used to send a control instruction of the second electronic device on a screen display content of the first electronic device; and an execution module, configured to, in a case that the control instruction is received, perform a control operation corresponding to the control instruction on the screen display content of the first electronic device.

According to a fourth aspect, an embodiment of the present application provides a screen control apparatus, applied to a second electronic device, and including:

a first input receiving module, configured to, in a case that a screen of multi-party video communication is displayed, receive a control operation by a second user on the second electronic device, where electronic devices participating in the multi-party video communication at least include a first electronic device and the second electronic device; and an input sending module, configured to, in a case that a first communication connection is established between the second electronic device and the first electronic device, in response to the control operation, send a control instruction corresponding to the control operation to the first electronic device through the first communication connection, where the first communication connection is used to transmit the control instruction of the second electronic device on a screen display content of the first electronic device.

According to a fifth aspect, an embodiment of the present application provides an electronic device, including: a processor, a memory, and a program or an instruction stored in the memory and capable of running on the processor, where when the program or the instruction is executed by the processor, the steps of the screen control method according to the first aspect or the second aspect are implemented.

According to a sixth aspect, an embodiment of the present application provides a readable storage medium, where the readable storage medium stores a program or an instruction, and when the program or the instruction is executed by a processor, the steps of the screen control method according to the first aspect or the second aspect are implemented.

According to a seventh aspect, an embodiment of the present application provides a chip, where the chip includes a processor and a communications interface, the communications interface is coupled to the processor, and the processor is configured to run a program or an instruction, to implement the steps of screen control method according to the first aspect or the second aspect.

DETAILED DESCRIPTION

Figure 1:
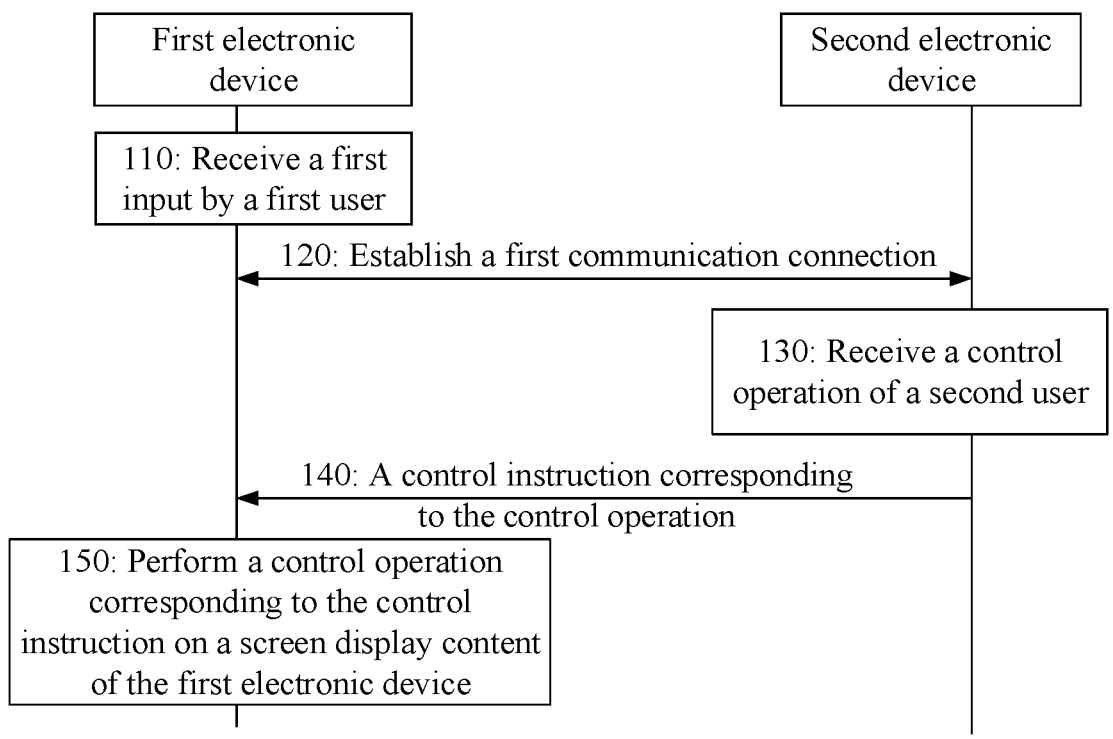
FIG. 1 is an overall flowchart of a screen control method according to some implementations of the present application.

The following describes the embodiments of this application with reference to the accompanying drawings. Apparently, the described embodiments are some but not all of the embodiments of this application. All other embodiments obtained by a person of ordinary skill in the art based on the embodiments of this application without creative efforts shall fall within the protection scope of this application.

For example, in the technology mentioned in the background, currently, during multi-party video communication, when it is needed to transfer an operation right to a user of a sub control device, there are only two methods: the user of the sub control device controls a main control device remotely, or a user of the main control device learns an operation of the user of the sub control device through a voice call, and then perform the operation.

In the technology mentioned in the background, first, an initiator of remote control needs to have administrator permission of a to-be-controlled device or learn the user name and password of the to-be-controlled device. A user of the sub control device may not know the user name or password of a main control device.

Second, if an initiator of remote control has permission on an operating system, the controller can execute any command on a controlled device, such as shutdown, deleting files, and installing software. As a result, security of a main control device is low, and there is a risk of privacy data leakage.

Third, in remote control, there may be a case in which that two users operate one controlled device at the same time. This easily leads to failure to operate a main control device correctly.

Fourth, if a user of a sub control device initiates remote control over a main control device, a user of the main control device is not able to end control of the sub control device over the main control device unless the device is turned off or power is turned off. As a result, the user of the main control device loses a control right of video communication, thereby affecting the video communication.

Based on the above, embodiments of the present application provide a screen control method. The method is performed by a main control device and a plurality of sub control devices. A first electronic device, a second electronic device, a third electronic device and a fourth electronic device are all electronic devices participating in multi-party video communication. The first electronic device is a main control device, the second electronic device, the third electronic device and the fourth electronic device are sub control devices.

In the multi-party video communication, a user of the main control device, as a host, has a right to operate a display content of the main control device. A user of the sub control device, as a participant, can view the screen display content of the main control device, but cannot directly operate the screen display content of the main control device. In some implementations, the multi-party video communication may include a remote video conference, distance video learning and other scenarios, which are not limited herein in the present application.

An overall procedure of the screen control method is first described with reference to FIG. 1. FIG. 1 is an overall flowchart of a screen control method according to an embodiment of the present application. The method includes:

S110: In a case that a screen of multi-party video communication is displayed, a first electronic device receives a first input by a first user.

Figure 2:
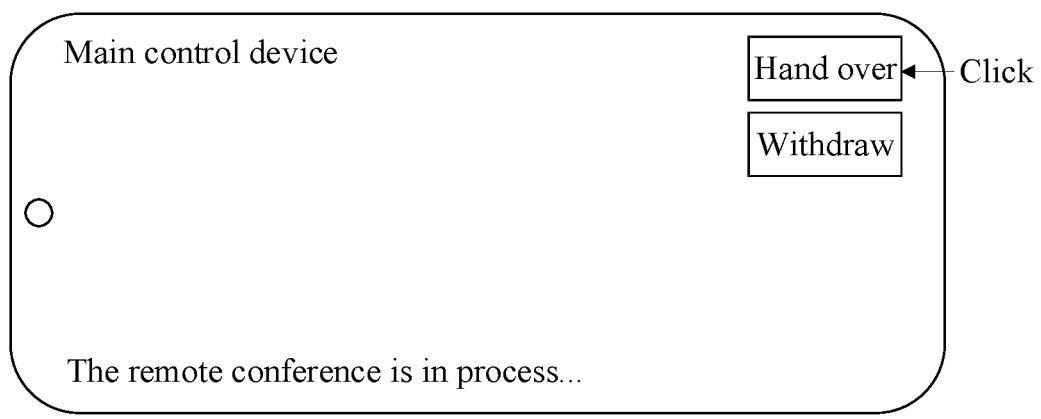
FIG. 2 is a schematic diagram of a hand over button according to some implementations of the present application.

The first input is not only used to hand over a control right to a second electronic device, but also used to select the second electronic device from a plurality of sub control devices to accept the control right. In some implementations, the first input may include an operation of the first user clicking a hand over button in a display screen of a multi-party video communication software (the hand over button may be set at the upper right corner of the display screen), as shown in FIG. 2. FIG. 2 is a schematic diagram of a hand over button according to an embodiment of the present application. As a main control device, the first electronic device may also include a gesture input by the first user for handing over a control right in the display screen of the multi-party video communication software. In addition, the first input may further include a control operation of selecting a second electronic device to accept a control right from a list of the second electronic devices. The content of the first input is not limited in the present application.

S120. The first electronic device, in response to the first input, establishes a first communication connection between the first electronic device and the second electronic device corresponding to the first input.

It should be noted that during the multi-party video communication, a communication connection is established between the main control device and the sub control device to transmit an image displayed on the main control device, a voice of the first user, an operation of the first user on the main control device, and other information to the sub control device, thereby achieving a purpose of the video communication. However, the communication connection established herein is different from the first communication connection mentioned above in the present application. The first communication connection in the present application is a communication connection that is separately established, in addition to a basic communication connection of the multi-party video communication, and used to transmit a control instruction of the second electronic device on a screen display content of the first electronic device, thereby achieving a purpose of transferring the control right.

Figure 3:
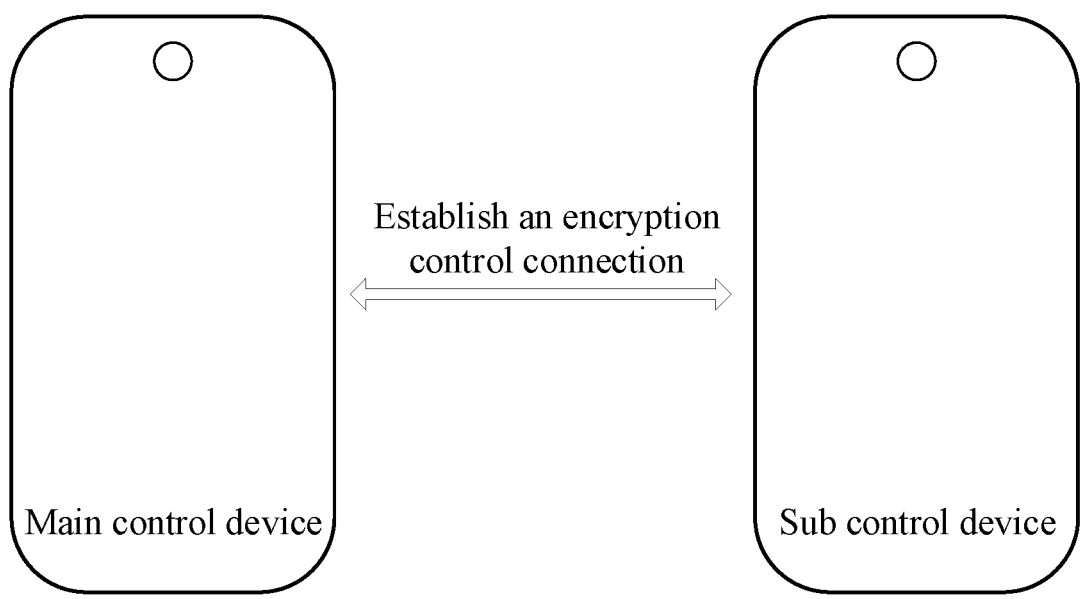
FIG. 3 is a schematic diagram of an encryption control connection establishment process according to some implementations of the present application.

The first communication connection herein may be an encryption control connection, as shown in FIG. 3. FIG. 3 is a schematic diagram of an encryption control connection establishment process according to an embodiment of the present application. The multi-party video communication software in the first electronic device (a main control device) is connected to a multi-party video communication software in the second electronic device (a sub control device) through the Internet. A specific connection establishment process may include a handshake connection and the like.

S130: In a case that the screen of multi-party video communication is displayed, the second electronic device receives a control operation by a second user on the second electronic device.

The control operation herein means an operation performed by the second user on a screen of the second electronic device. A content of the control operation may include turning to a next slide of a Power Point presentation, writing on the screen, and other operations. The specific content of the control operation is not limited in the present application.

S140. The second electronic device, in response to the control operation, sends a control instruction corresponding to the control operation to the first electronic device through the first communication connection.

Figure 4:
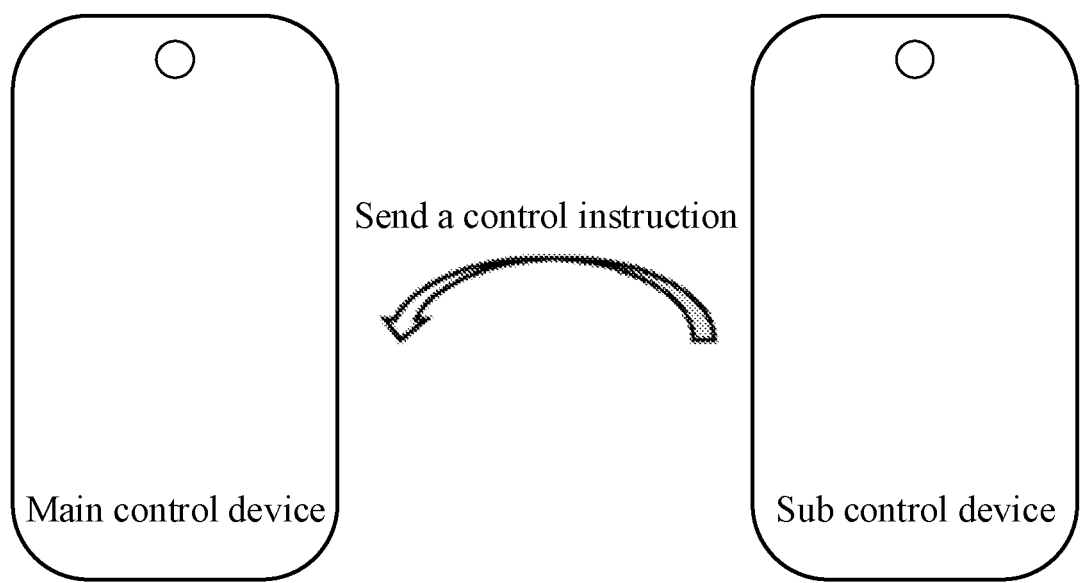
FIG. 4 is a schematic diagram of control operation transmission according to some implementations of the present application.

The multi-party video communication software in the second electronic device (a sub control device) sends the control instruction to the first electronic device (a main control device) through the first communication connection. As shown in FIG. 4, FIG. 4 is a schematic diagram of control instruction transmission according to an embodiment of the present application.

S150: in a case that the control instruction is received, the first electronic device performs a control operation corresponding to the control instruction on the screen display content of the first electronic device.

After receiving the control instruction, the first electronic device performs a corresponding control operation on applications (Power Point, Notepad, and the like) running in the foreground on the screen of the first electronic device according to the received control instruction.

In some embodiments of the present application, during the multi-party video communication, after receiving the first input by the first user, the first electronic device can establish the first communication connection with the second electronic device. The first communication connection is used to transmit the control instruction of the second electronic device on the screen display content of the first electronic device, and perform the control operation corresponding to the control instruction on the screen display content of the first electronic device. It can be learned that in this embodiment, an operation right of a screen can be transferred to the second electronic device through the first input by the first user on the first electronic device, so that the user of the second electronic device can operate the screen display content of the first electronic device through the established first communication connection. This simplifies an operation process in which the user of the second electronic device operates the screen display content during the multi-party video communication, thereby improving convenience for users.

After the first electronic device hands over the control right to the second electronic device, it is usually necessary to withdraw the control right. Based on this, in some embodiments of the present application, after S120, the method may further include that the first electronic device receives a second input by the first user; and that the first electronic device, in response to the second input, disconnects the first communication connection with the second electronic device.

Figure 5:
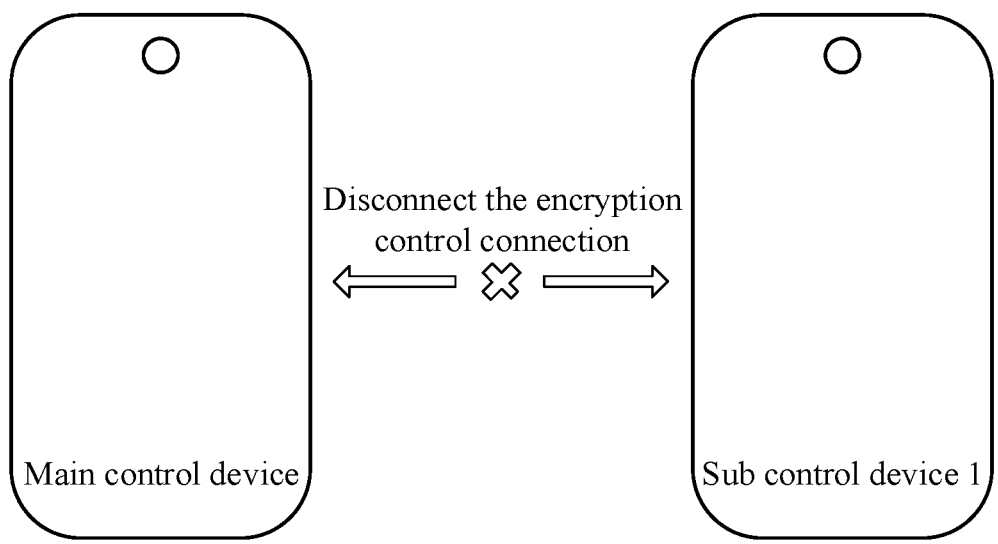
FIG. 5 is a schematic diagram of disconnecting a first communication connection according to some implementations of the present application.

In some embodiments, the first user can actively disconnect the first communication connection with the second electronic device through the second input, as shown in FIG. 5. FIG. 5 is a schematic diagram of disconnecting a first communication connection according to some embodiments of the present application. After the connection is disconnected, the first electronic device (a main control device) withdrew the control right previously handed over to the second electronic device (a sub control device 1), so that subsequently the second electronic device cannot continue to operate a screen content displayed on the first electronic device. This method of actively withdrawing the control right improves the initiative of the first user.

Figure 6:
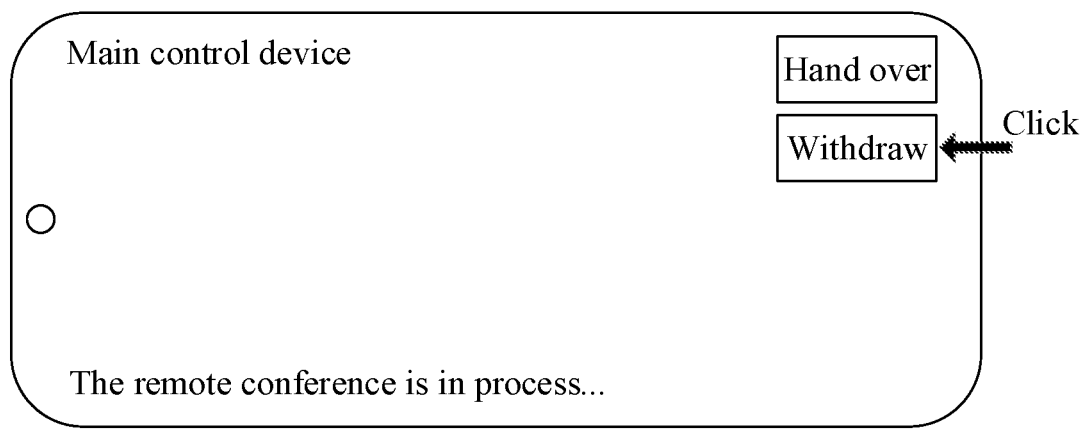
FIG. 6 is a schematic diagram of a withdraw button according to some implementations of the present application.

In some implementations, the second input may include an input operation of the first user clicking the withdraw button set in the display screen of the first electronic device, as shown in FIG. 6. FIG. 6 is a schematic diagram of a withdraw button according to an embodiment of the present application. The withdraw button may be set in the upper right corner of the display screen. In some implementations, the second input may also be a withdrawal gesture input of the first user in the display screen of the first electronic device (a main control device). The specific content of the second input is not limited in the present application.

After the first electronic device hands over the control right to the second electronic device, the second electronic device can hand back the control right to the first electronic device after the operation is completed. Based on this situation, in some embodiments of the present application, after S120, the method may further include:

that the second electronic device receives a fourth input by the second user;

that the second electronic device, in response to the fourth input, disconnects the first communication connection with the first electronic device; and that in a case that it is detected that the second electronic device is disconnected from the first communication connection, the first electronic device disconnects the first communication connection with the second electronic device.

In some embodiments, the second user can actively disconnect the first communication connection with the first electronic device through the fourth input. After the connection is disconnected, the second electronic device hands back the control right handed over by the first electronic device, so that subsequently the second electronic device cannot continue to operate the screen content displayed on the first electronic device. This method of actively handing back the control right improves the initiative of the second user.

Figure 7:
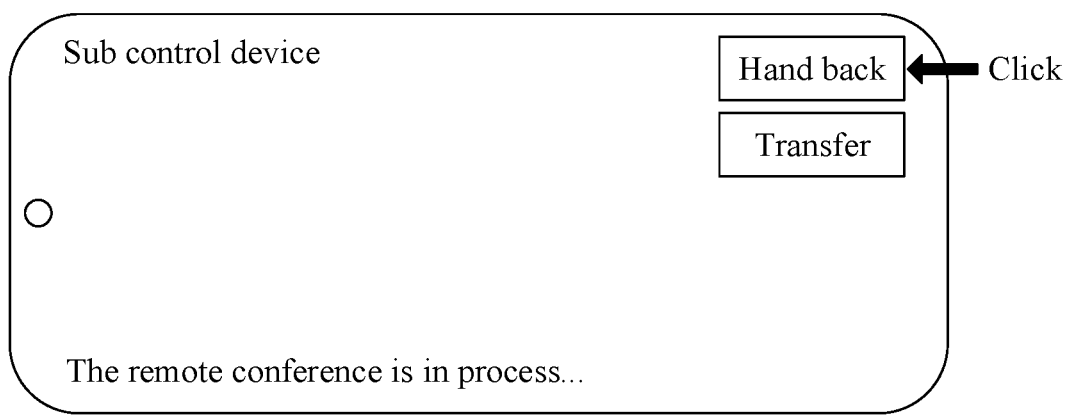
FIG. 7 is a schematic diagram of a hand back button according to some implementations of the present application.

In some implementations, the fourth input may include an input operation of the second user clicking the hand back button set in the display screen of the second electronic device (a sub control device), as shown in FIG. 7. FIG. 7 is a schematic diagram of a hand back button according to an embodiment of the present application. The hand back button may be set in the upper right corner of the display screen. In some implementations, the third input may also be a hand back gesture input of the second user in the display screen of the second electronic device. The specific content of the fourth input is not limited in the present application.

Figure 10:
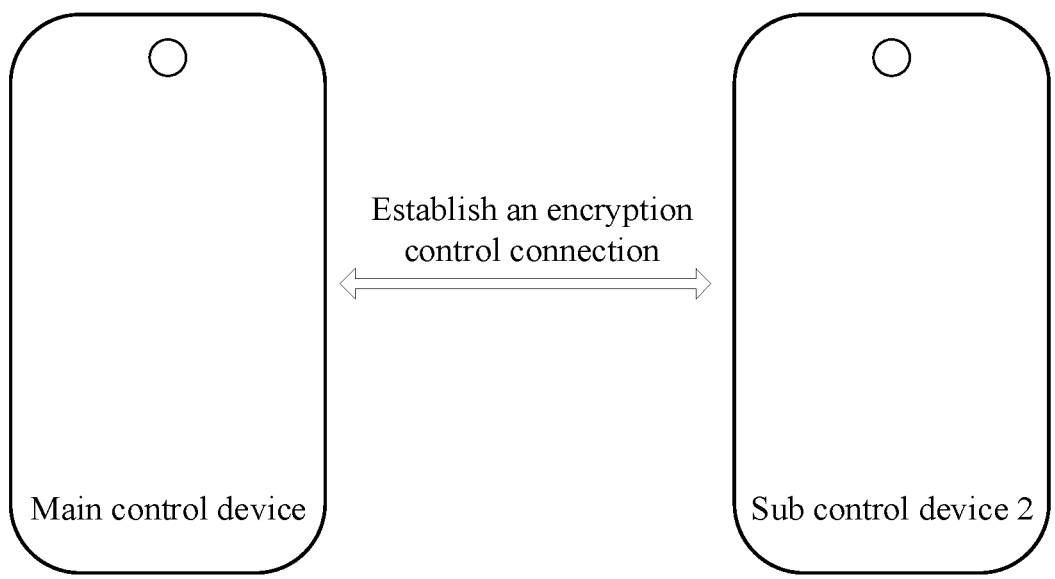
FIG. 10 is a schematic diagram of establishing a second communication connection according to some implementations of the present application.

Because there are a plurality of sub control devices during the multi-party video communication, there may be a case that another sub control device needs to perform a screen operation after a second electronic device completes a screen operation. Based on this, in some other embodiments of the present application, after S120, the method may further include:

that the second electronic device receives a fifth input by the second user;

that the second electronic device, in response to the fifth input, sends an inquiry request to the first electronic device, where the inquiry request includes an identifier of a third electronic device;

that the first electronic device receives the inquiry request sent by the second electronic device, where the inquiry request is used to inquire whether to establish a communication connection with the third electronic device, and the inquiry request includes the identifier of the third electronic device; and that in a case that a determination input of the inquiry request by the first user is received, the first electronic device (a main control device) disconnects the first communication connection (refer to FIG. 5) with the second electronic device, and establish a second communication connection with the third electronic device (a sub control device 2) (refer to FIG. 10). The second communication connection may be an encrypted control connection.

In some embodiments, the second user can initiate an operation of transferring a control right through the fifth input, and send the identifier of the third electronic device that wants to receive the control right to the first electronic device. In a case that the first user agrees to the transfer operation, the first electronic device can establish a communication connection with the third electronic device, so that subsequently a user of the third electronic device can transmit the control instruction to the first electronic device for execution through the second communication connection, that is, the control right is transferred to the third electronic device. This method of transferring control rights enriches methods by using which each device obtains a control right and simplifies handing over of the control right by a main control device.

Figure 8:
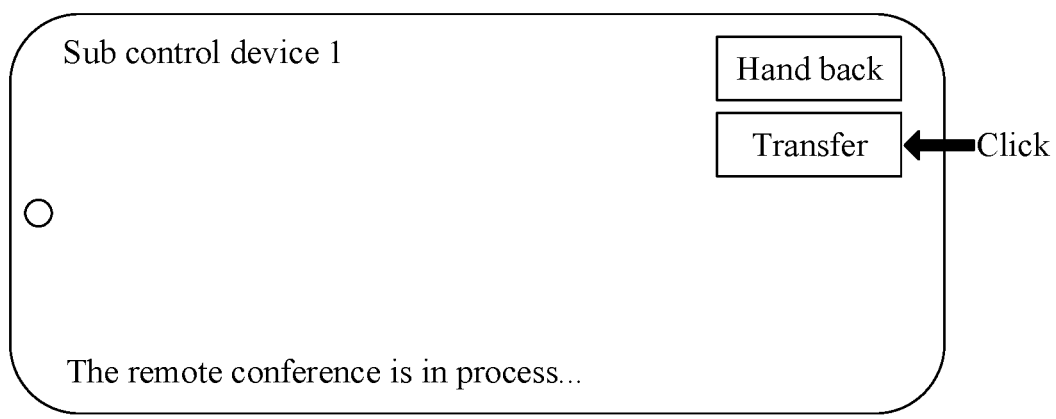
FIG. 8 is a schematic diagram of a transfer button according to some implementations of the present application.

In some implementations, the fifth input may include an input operation of the second user clicking a transfer button set in the display screen of the second electronic device, as shown in FIG. 8. FIG. 8 is a schematic diagram of a transfer button according to an embodiment of the present application. The transfer button may be set in the upper right corner of the display screen. In some implementations, the fifth input may also be a transfer gesture input of the second user in the display screen of the second electronic device (a sub control device 1 in FIG. 8). The content of the fifth input is not limited in the present application.

Figure 9:
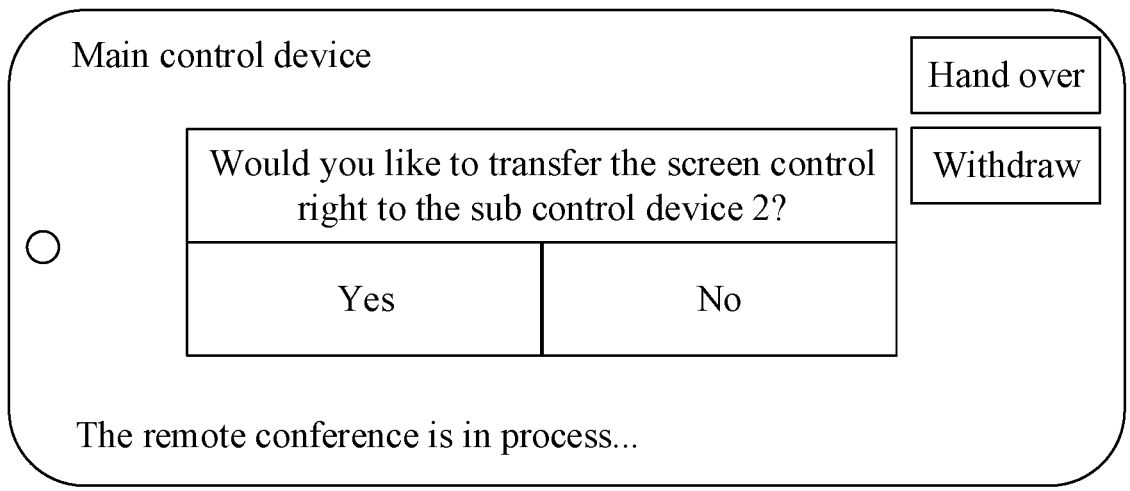
FIG. 9 is a schematic diagram of an inquiry request according to some implementations of the present application.

In some implementations, the first electronic device can display the inquiry request by popping up a prompt box, as shown in FIG. 9. The FIG. 9 is a schematic diagram of an inquiry request in a first electronic device (a main control device) according to an embodiment of the present application. The inquiry request may include such sentence as "Would you like to transfer the screen control right to the sub control device 2." The specific content of the inquiry request is not limited in the present application.

In addition, in a case that the first electronic device receives a rejection input of the inquiry request from the first user, the first communication connection with the second electronic device is disconnected, and the operation right returns to the first electronic device.

In some other embodiments of the present application, the method further includes:

that the first electronic device receives gesture information sent by the fourth electronic device, where in a case that the fourth electronic device receives a preset gesture input, for example, a hand raising input, the fourth electronic device sends the gesture information to the first electronic device, and the gesture information may include user information of the fourth electronic device. For example, the display screen of the multi-party video communication software of the fourth electronic device may be provided with a hand raising button, and the preset gesture input may include a click input on the hand raising button, and the like. The fourth electronic device is a device other than the first electronic device among the devices participating in the multi-party video communication.

The first electronic device may display the gesture information sent by each of the fourth electronic devices according to a chronological order of receiving the gesture information.

The first electronic device or the sub control device that is speaking can receive the third input of the first user on the target gesture information in each piece of gesture information; in response to the third input, allow a user of the target fourth electronic device corresponding to the target gesture information to be a next speaker; and start a speaking function of the target fourth electronic device corresponding to the target gesture information. This method avoids mutual interference caused by a plurality of speakers at meeting, helping a user of a main control device manage speeches.

In some implementations, in a case that the first electronic device displays a speaking order list of a user of each of the fourth electronic device, after a target fourth electronic device in an activated state turns off a speaking function, the first electronic device sends first prompt information to a fourth electronic device behind the target fourth electronic device in the speaking order list, where the first prompt information is used to instruct the fourth electronic device behind the target fourth electronic device to start the speaking function.

In some implementations, the first electronic device can send the first prompt information after receiving the prompt input by the first user. In some implementations, the first prompt information can be automatically sent after a previous user finishes speaking for a preset length of time and before a next user speaks. This method can avoid that after the previous speaker finishes his speech, the next speaker forgets to speak.

In some implementations, in a case that it is detected that a current speech content contains a user name, the first electronic device sends second prompt information to the fourth electronic device corresponding to the user name, and the second prompt information is used to prompt the user of the fourth electronic device that its name appears in the current speech content, for example, the second prompt information is information that is @+name. This method can prompt a called participant when one participant calls another participant, so as to improve efficiency during the video communication. The participants herein mean users who participate in the multi-party video communication.

In some implementations, the display screen of each electronic device participating in multi-party video communication may be provided with interactive buttons, such as an applause button, and a flower sending button, so that interactive information corresponding to the interactive button is displayed after receiving a trigger of the interactive button. This method adds enjoyment during multi-party video communication.

Figure 11:
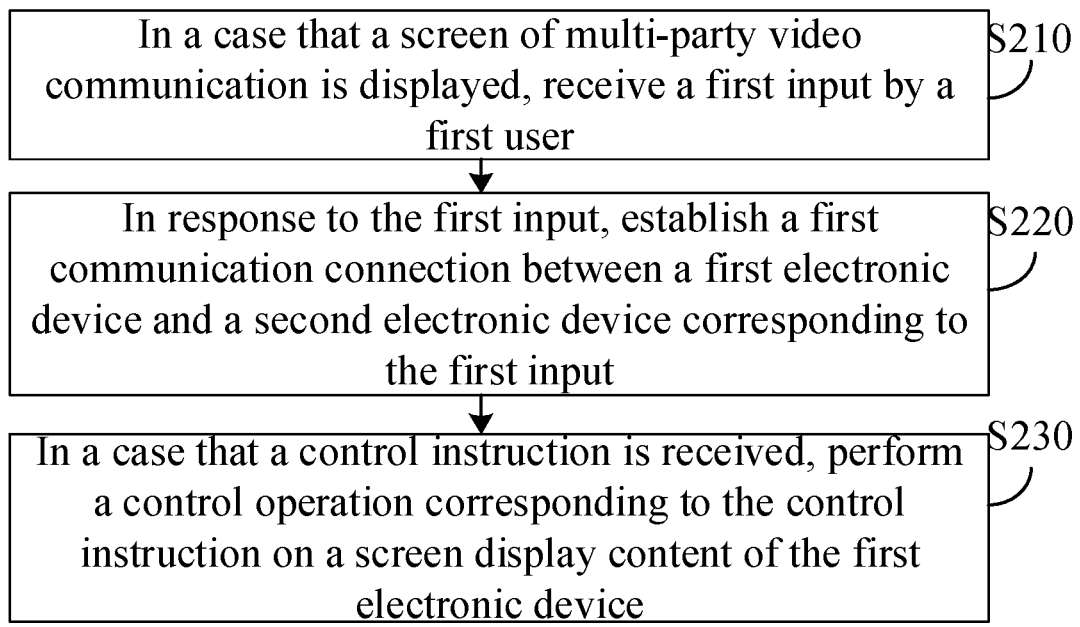
FIG. 11 is a schematic flowchart of a screen control method applied to a first electronic device according to some implementations of the present application.

Based on an overall procedure of the screen control method described in the embodiment, the procedure performed by the first electronic device in the screen control method is described below. Referring to FIG. 11, FIG. 11 is a schematic flowchart of a screen control method applied to a first electronic device according to some embodiments of the present application. The method includes:

S210: In a case that a screen of multi-party video communication is displayed, receive a first input by a first user.

S220: In response to the first input, establish a first communication connection between the first electronic device and a second electronic device corresponding to the first input.

S230: In a case that the control instruction is received, perform a control operation corresponding to a control instruction on a screen display content of the first electronic device.

In some embodiments, an operation right of a screen can be transferred to the second electronic device through the first input by the first user on the first electronic device, so that the second user can operate the screen display content of the first electronic device. This simplifies an operation process in which the second user operates the screen display content during the multi-party video communication, thereby improving convenience for users.

In some embodiments, after the S220, the method may further include:
  receiving a second input by the first user; and
  in response to the second input, disconnecting the first communication connection with the second electronic device.

In some embodiments, the first user can actively disconnect the first communication connection with the second electronic device through the second input. After the connection is disconnected, the first electronic device withdraws the control right handed over to the second electronic device, so that subsequently the second electronic device cannot continue to operate the screen content displayed on the first electronic device. This method of actively withdrawing the control right improves the initiative of the first user.

In some embodiments, after the S220, the method may further include:
  in a case that it is detected that the second electronic device is disconnected from the first communication connection, disconnecting the first communication connection with the second electronic device.

In some embodiments, the first electronic device detects that the second electronic device disconnects the first communication connection, indicating that the second electronic device actively hands back the control right. Therefore, the first electronic device side also disconnects the first communication connection, thereby withdrawing the control right. This method improves the initiative of the second user.

In some embodiments, after the S220, the method may further include:
  receiving an inquiry request sent by the second electronic device, where the inquiry request is used to inquire whether to establish a communication connection with a third electronic device, and the inquiry request includes an identifier of the third electronic device; and
  in a case that a determination input of the inquiry request by a user is received, disconnecting the first communication connection with the second electronic device, and establishing a second communication connection with the third electronic device.

In some embodiments, the control right is transferred to the third electronic device by agreeing with the inquiry request sent by the second electronic device. This method of transferring the control right enriches methods by using which each device obtains a control right, and simplifies handing over of the control right by a user of a main control device.

In some implementations, the method may further include:
  receiving gesture information sent by a fourth electronic device, where the fourth electronic device is a device other than the first electronic device among the devices participating in the multi-party video communication;
  displaying the gesture information sent by each of the fourth electronic devices according to a chronological order of receiving the gesture information;
  receiving a third input by the first user on target gesture information in the gesture information; and
  in response to the third input, starting a speaking function of a target fourth electronic device corresponding to the target gesture information.

This method avoids mutual interference caused by a plurality of speakers at meeting, helping a user of a main control device manage speeches.

In some implementations, the method may further include:
  in a case that the first electronic device displays a speaking order list of a user of each of the fourth electronic device, after a target fourth electronic device whose speaking function is in an activated state turns off the speaking function, sending first prompt information to a fourth electronic device behind the target fourth electronic device in the speaking order list, where the first prompt information is used to instruct the fourth electronic device behind the target fourth electronic device to start the speaking function.

In some implementations, the first electronic device can send the first prompt information after receiving the prompt input by the first user. In some implementations, the first prompt information can be automatically sent after a previous user finishes speaking for a preset length of time and before a next user speaks. This method can avoid that after the previous speaker finishes his speech, the next speaker forgets to speak.

In some implementations, the method further includes:
in a case that it is detected that a current speech content contains a user name, sending second prompt information to the fourth electronic device corresponding to the user name, and the second prompt information is used to prompt the user of the fourth electronic device that its name appears in the current speech content.

This method can prompt a called participant when one participant calls another participant, so as to improve efficiency during the video communication. The participants herein mean users who participate in the multi-party video communication.

In some implementations, the display screen of the first electronic device may be provided with interactive buttons, such as an applause button, and a flower sending button, so that interactive information corresponding to the interactive button is displayed after receiving a trigger of the interactive button. This method adds enjoyment during multi-party video communication.

For detailed descriptions of the foregoing first electronic device side in the embodiment, reference can be made to the embodiment of the foregoing overall procedure of the screen control method. To avoid repetition, it will not be repeated here.

Figure 12:
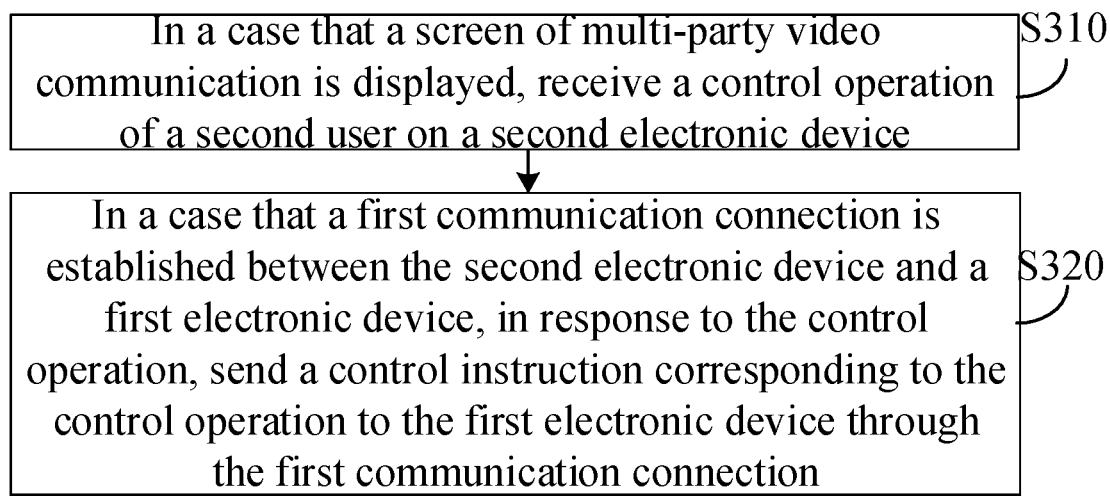
FIG. 12 is a schematic flowchart of a screen control method applied to a second electronic device according to some implementations of the present application.

Based on an overall procedure of the screen control method described in the embodiment, the procedure performed by the second electronic device in the screen control method is described below. Referring to FIG. 12, FIG. 12 is a schematic flowchart of a screen control method applied to a second electronic device according to some embodiments of the present application.

S310: In a case that a screen of multi-party video communication is displayed, receive a control operation of a second user on the second electronic device.

S320: In a case that a first communication connection is established between the second electronic device and a first electronic device, in response to the control operation, send a control instruction corresponding to the control operation to the first electronic device through the first communication connection.

In some embodiments, an operation right of a screen can be transferred to the second electronic device through the first input by the first user on the first electronic device, so that the second user can operate the screen display content of the first electronic device. This simplifies an operation process in which the second user operates the screen display content during the multi-party video communication, thereby improving convenience for users.

In some embodiments, the method may further include:
in a case that the first communication connection is established between the second electronic device and the first electronic device, receiving a fourth input by the second user; and
in response to the fourth input, disconnecting the first communication connection with the first electronic device.

In some embodiments, the second user can actively disconnect the first communication connection with the first electronic device through the fourth input. After the connection is disconnected, the second electronic device hands back the control right handed over by the first electronic device, so that subsequently the second electronic device cannot continue to operate the screen content displayed on the first electronic device. This method of actively handing back the control right improves the initiative of the second user.

In some embodiments, the method may further include:
in a case that the first communication connection is established between the second electronic device and the first electronic device, receiving a fifth input by the second user; and
in response to the fifth input, sending an inquiry request to the first electronic device, where the inquiry request includes an identifier of a third electronic device, so that in a case that a determination input of the inquiry request by the first user is received, the first electronic device disconnects the first communication connection with the second electronic device, and establishes a second communication connection with the third electronic device.

In some embodiments, the second user can initiate an operation of transferring a control right through the fifth input, and send the identifier of the third electronic device that wants to receive the control right to the first electronic device. In a case that the first user agrees to the transfer operation, the first electronic device can establish a communication connection with the third electronic device, so that subsequently a user of the third electronic device can transmit the control instruction to the first electronic device for execution through the second communication connection, that is, the control right is transferred to the third electronic device. This method of transferring control rights enriches methods by using which each device obtains a control right and simplifies handing over of the control right by a user of a main control device.

For detailed descriptions of the foregoing second electronic device side in the embodiment, reference can be made to the embodiment of the foregoing overall procedure of the screen control method. To avoid repetition, it will not be repeated here.

It should be noted that, the screen control method provided in the embodiment of the present application can be performed by a screen control device or a control module in the screen control device for performing a loading screen control method. In this embodiment of the present application, an example in which a screen control apparatus performs a loading screen control method is used to describe the screen control method provided in this embodiment of the present application.

Figure 13:
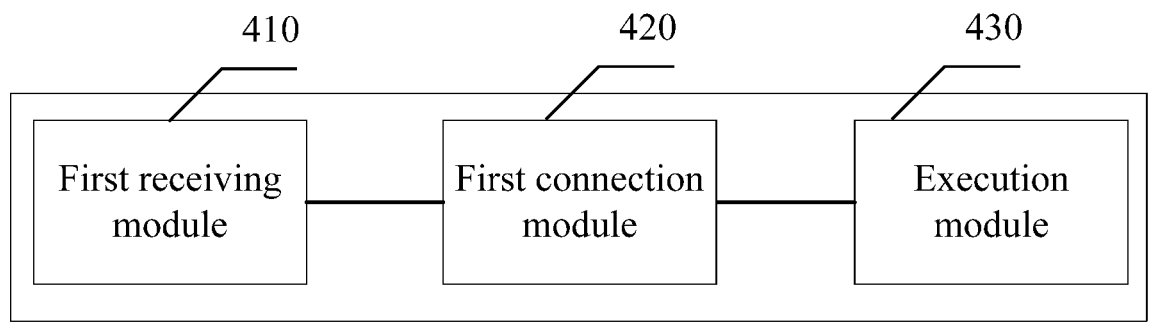
FIG. 13 is a schematic structural diagram of a screen control apparatus applied to a first electronic device according to some implementations of the present application.

Based on the screen control method embodiment provided in the foregoing embodiment, correspondingly, an embodiment of the present application further provides a screen control device, applied to a first electronic device. FIG. 13 is a schematic structural diagram of a screen control apparatus applied to a first electronic device according to the present application. As shown in FIG. 13, the apparatus includes:

a first receiving module 410, configured to, in a case that a screen of multi-party video communication is displayed, receives a first input by a first user;

a first connection module 420, configured to, in response to the first input, establish a first communication connection between the first electronic device and a second electronic device corresponding to the first input, where the first communication connection is used to send a control instruction of the second electronic device on a screen display content of the first electronic device; and an execution module 430, configured to, in a case that the control instruction is received, perform a control operation corresponding to the control instruction on the screen display content of the first electronic device.

In some embodiments of the present application, during the multi-party video communication, after receiving the first input by the first user, the first electronic device can establish the first communication connection with the second electronic device. The first communication connection is used to transmit the control instruction of the second electronic device on the screen display content of the first electronic device, and perform the control operation corresponding to the control instruction on the screen display content of the first electronic device. It can be learned that in this embodiment, an operation right of a screen can be transferred to the second electronic device through the first input by the first user on the first electronic device, so that the user of the second electronic device can operate the screen display content of the first electronic device through the established first communication connection. This simplifies an operation process in which the user of the second electronic device operates the screen display content during the multi-party video communication, thereby improving convenience for users.

In some embodiments, the apparatus may further include:
a first disconnection module, configured to, in a case that it is detected that the second electronic device is disconnected from the first communication connection, disconnect the first communication connection with the second electronic device.

In some embodiments, the first electronic device detects that the second electronic device disconnects the first communication connection, indicating that the second electronic device actively hands back the control right. Therefore, the first electronic device side also disconnects the first communication connection, thereby withdrawing the control right. This method improves the initiative of the second user.

In some embodiments, the apparatus may further include:
an inquiry receiving module, configured to receive an inquiry request sent by the second electronic device, where the inquiry request is used to inquire whether to establish a communication connection with a third electronic device, and the inquiry request includes an identifier of the third electronic device; and
a second disconnection module, configured to, in a case that a determination input of the inquiry request by the first user is received, disconnect the first communication connection with the second electronic device, and establish a second communication connection with the third electronic device.

In some embodiments, the control right is transferred to the third electronic device by agreeing with the inquiry request sent by the second electronic device. This method of transferring the control right enriches methods by using which each device obtains a control right, and simplifies handing over of the control right by a user of a main control device.

In some embodiments, the apparatus may further include:
a second receiving module, configured to receive a second input by the first user; and
a third disconnection module, configured to, in response to the second input, disconnect the first communication connection with the second electronic device.

In some embodiments, the first user can actively disconnect the first communication connection with the second electronic device through the second input. After the connection is disconnected, the first electronic device withdraws the control right handed over to the second electronic device, so that subsequently the second electronic device cannot continue to operate the screen content displayed on the first electronic device. This method of actively withdrawing the control right improves the initiative of the first user.

In some implementations, the apparatus may further include:
a gesture information receiving module, configured to receive gesture information sent by a fourth electronic device, where the fourth electronic device is a device other than the first electronic device among the devices participating in the multi-party video communication;
a first display module, configured to display the gesture information sent by each of the fourth electronic devices according to a chronological order of receiving the gesture information;
a third receiving module, configured to receive a third input by the first user on target gesture information in the gesture information; and
a speaking module, configured to, in response to the third input, starts a speaking function of a target fourth electronic device corresponding to the target gesture information.

This method avoids mutual interference caused by a plurality of speakers at meeting, helping a user of a main control device manage speeches.

In some implementations, the apparatus may further include:
a first prompt module, configured to, in a case that the first electronic device displays a speaking order list of a user of each of the fourth electronic device, after the target fourth electronic device in an activated state turns off the speaking function, sending first prompt information to a fourth electronic device behind the target fourth electronic device in the speaking order list, where the first prompt information is used to instruct the fourth electronic device behind the target fourth electronic device to start the speaking function.

In some implementations, the first electronic device can send the first prompt information after receiving the prompt input by the first user. In some implementations, the first prompt information can be automatically sent after a previous user finishes speaking for a preset length of time and before a next user speaks. This method can avoid that after the previous speaker finishes his speech, the next speaker forgets to speak.

In some implementations, the apparatus further includes:
a second prompt module, configured to, in a case that it is detected that a current speech content contains a user name, send second prompt information to the fourth electronic device corresponding to the user name, where the second prompt information is used to prompt the user of the fourth electronic device that its name appears in the current speech content.

This method can prompt a called participant when one participant calls another participant, so as to improve efficiency during the video communication. The participants herein mean users who participate in the multi-party video communication.

In some implementations, the display screen of the first electronic device may be provided with interactive buttons, such as an applause button, and a flower sending button. The apparatus further includes:
an interactive module, configured to display interactive information corresponding to the interactive button after receiving a trigger of the interactive button. This method adds enjoyment during multi-party video communication.

The apparatus provided in some embodiments of the present application can implement the steps implemented by the first electronic device in the method embodiment of FIG. 11. To avoid repetition, details are not described herein again.

Figure 14:
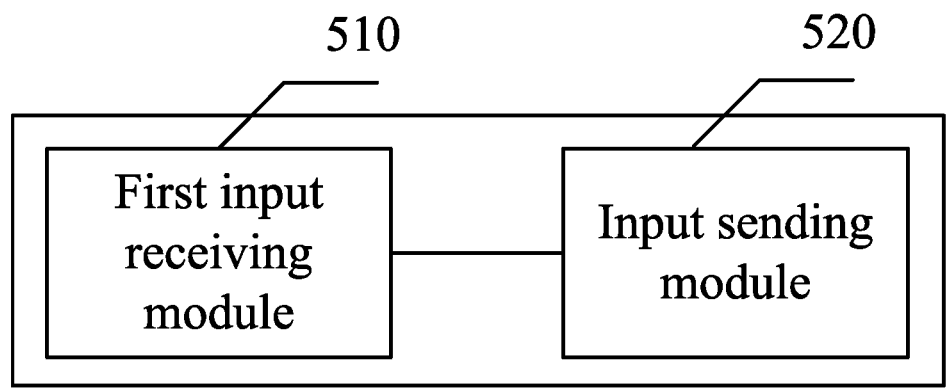
FIG. 14 is a schematic structural diagram of a screen control apparatus applied to a second electronic device according to some implementations of the present application.

Based on the screen control method embodiment provided in the foregoing embodiment, correspondingly, an embodiment of the present application further provides a screen control device, applied to a second electronic device. Refer to FIG. 14. FIG. 14 is a schematic structural diagram of a screen control apparatus applied to a second electronic device according to the present application. As shown in FIG. 14, the apparatus includes:

- a first-input receiving module 510, configured to, in a case that a screen of multi-party video communication is displayed, receive a control operation by a second user on the second electronic device, where electronic devices participating in the multi-party video communication at least include a first electronic device and the second electronic device; and
- an input sending module 520, configured to, in a case that a first communication connection is established between the second electronic device and the first electronic device, in response to the control operation, send a control instruction corresponding to the control operation to the first electronic device through the first communication connection.

In some embodiments, an operation right of a screen can be transferred to the second electronic device through the first input by the first user on the first electronic device, so that the user of the second electronic device can operate the screen display content of the first electronic device through the established first communication connection. This simplifies an operation process in which the user of the second electronic device operates the screen display content during the multi-party video communication, thereby improving convenience for users.

In some embodiments, the apparatus may further include:
- a fourth receiving module, configured to, in a case that the first communication connection is established between the second electronic device and the first electronic device, receive a fourth input by the second user; and
- a fourth disconnection module, configured to, in response to the fourth input, disconnect the first communication connection with the first electronic device.

In some embodiments, the second user can actively disconnect the first communication connection with the first electronic device through the fourth input. After the connection is disconnected, the second electronic device hands back the control right handed over by the first electronic device, so that subsequently the second electronic device cannot continue to operate the screen content displayed on the first electronic device. This method of actively handing back the control right improves the initiative of the second user.

In some embodiments, the apparatus may further include:
- a fifth receiving module, configured to, in a case that the first communication connection is established between the second electronic device and the first electronic device, receive a fifth input by the second user; and
- an inquiry sending module, configured to, in response to the fifth input, send an inquiry request to the first electronic device, where the inquiry request includes an identifier of a third electronic device, so that in a case that a determination input of the inquiry request by the first user is received, the first electronic device disconnects the first communication connection with the second electronic device, and establishes a second communication connection with the third electronic device.

In some embodiments, the second user can initiate an operation of transferring a control right through the fifth input, and send the identifier of the third electronic device that wants to receive the control right to the first electronic device. In a case that the first user agrees to the transfer operation, the first electronic device can establish a communication connection with the third electronic device, so that subsequently a user of the third electronic device can transmit the control operation to the first electronic device for execution through the second communication connection, that is, the control right is transferred to the third electronic device. This method of transferring control rights enriches methods by using which each device obtains a control right and simplifies handing over of the control right by a user of a main control device.

The apparatus provided in some embodiments of the present application can implement the method steps implemented by the second electronic device in the method embodiment in FIG. 12. To avoid repetition, details are not described herein again.

The screen control apparatus in the embodiments of the present application may be an apparatus, or a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like. The non-mobile electronic device may be a server, a Network Attached Storage (NAS), a personal computer, a television, a teller machine, a self-service machine, or the like. This is not specifically limited in the embodiments of the present application.

The screen control apparatus in the embodiments of the present application may be an apparatus with an operating system. The operating system may be an Android operating system, may be an iOS operating system, or may be another possible operating system, which is not specifically limited in the embodiments of the present application.

In some implementations, the present application further provides an electronic device, including a processor, a memory, and a program or instruction stored in the memory and capable of running on the processor. When the program or the instruction is executed by the processor, the processes of the foregoing screen control method embodiments are implemented, with the same technical effects achieved. To avoid repetition, details are not described herein again.

It should be noted that the electronic device in the embodiments of the present application includes the foregoing mobile electronic device and non-mobile electronic device.

Figure 15:
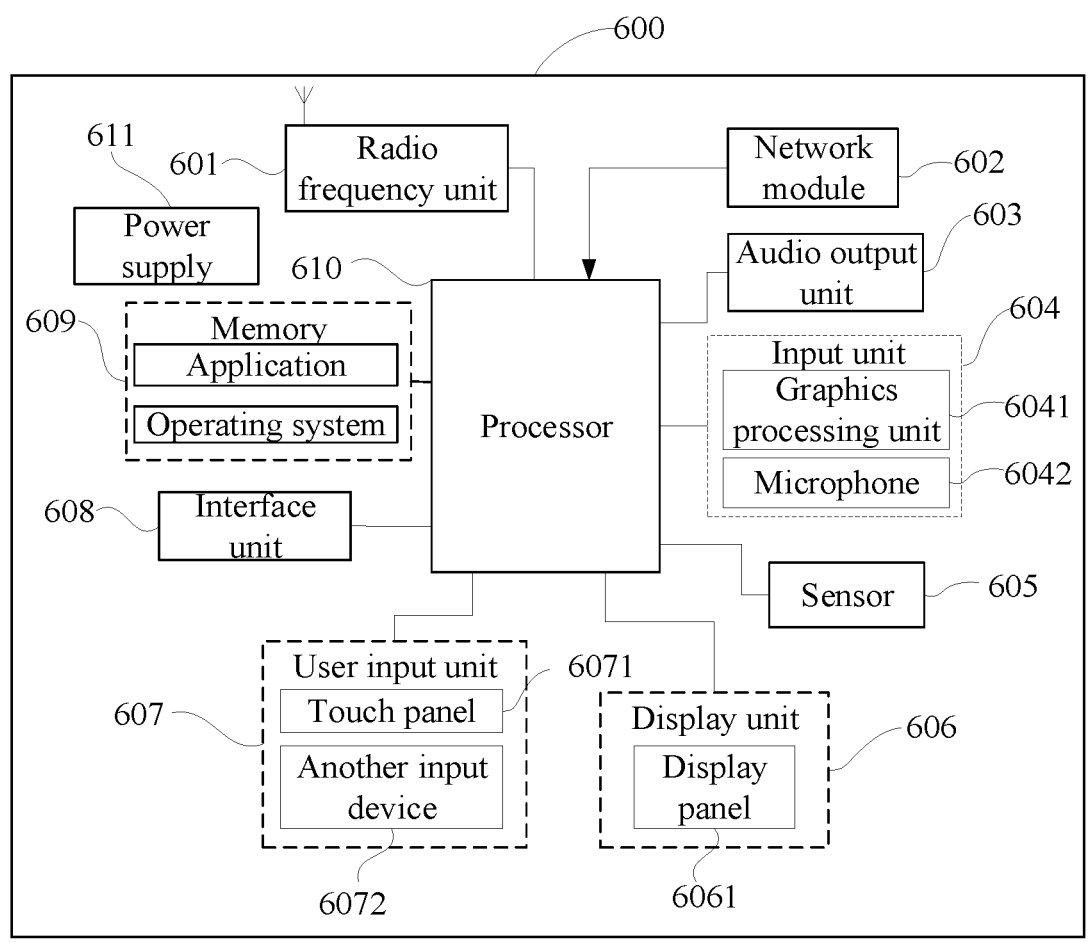
FIG. 15 is a schematic diagram of a hardware structure of an electronic device according to some implementations of the present application.

FIG. 15 is a schematic diagram of a hardware structure of an electronic device according to an embodiment of the present application.

The electronic device 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that a structure of the electronic device shown in FIG. 15 constitutes no limitation on the electronic device, and the electronic device may include more or fewer components than those shown in the figure, or have a combination of some components, or have a different component arrangement.

When the electronic device 600 is a first electronic device,
the display unit 606, configured to display a multi-party video communication screen;
the user input unit 607, configured to receive a first input by a first user;
the network module 602, configured to, in response to the first input, establish a first communication connection between the first electronic device and a second electronic device corresponding to the first input, and receive a control instruction sent by the second electronic device through the first communication connection, where both the first electronic device and the second electronic device are electronic devices participating in the multi-party video communication; and the first communication connection is used to send a control instruction of the second electronic device on a screen display content of the first electronic device; and
the processor 610, configured to, in a case that the control instruction is received, perform a control operation corresponding to the control instruction on the screen display content of the first electronic device.

When the electronic device 600 is a second electronic device,
the user input unit 607, configured to, in a case that a screen of multi-party video communication is displayed, receive a control operation by a second user on the second electronic device, where electronic devices participating in the multi-party video communication at least include a first electronic device and the second electronic device; and
the processor 610, configured to, in a case that a first communication connection is established between the second electronic device and the first electronic device, in response to the control operation, send a control instruction corresponding to the control operation to the first electronic device through the first communication connection, where the first communication connection is used to transmit the control instruction of the second electronic device on a screen display content of the first electronic device.

In some embodiments of the present application, during the multi-party video communication, after receiving the first input by the first user, the first electronic device can establish the first communication connection with the second electronic device. The first communication connection is used to transmit the control instruction of the second electronic device on the screen display content of the first electronic device, and perform the control operation corresponding to the control instruction on the screen display content of the first electronic device. It can be learned that in this embodiment, an operation right of a screen can be transferred to the second electronic device through the first input by the first user on the first electronic device, so that the user of the second electronic device can operate the screen display content of the first electronic device through the established first communication connection. This simplifies an operation process in which the user of the second electronic device operates the screen display content during the multi-party video communication, thereby improving convenience for users.

It should be understood that, in some embodiments of this application, the radio frequency unit 601 may be configured to receive and send information or a signal in a call process. In some implementations, after receiving downlink data from a base station, the radio frequency unit 601 sends the downlink data to the processor 610 for processing. In addition, the radio frequency unit 601 sends uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with another device by using a wireless communication system and network.

The electronic device provides users with wireless broadband Internet access through the network module 602, for example, helps users receive and send e-mails, browse web pages, and access streaming media.

The audio output unit 603 may convert audio data received by the radio frequency unit 601 or the network module 602 or stored in the memory 609 into an audio signal and output the audio signal as a sound. Moreover, the audio output unit 603 may further provide audio output related to a specific function performed by the electronic device 600 (for example, a call signal receiving sound and a message receiving sound). The audio output unit 603 includes a loudspeaker, a buzzer, a telephone receiver, and the like.

The input unit 604 is configured to receive an audio signal or a video signal. The input unit 604 may include a Graphics Processing Unit (GPU) 6041 and a microphone 6042, and the graphics processing unit 6041 processes image data of a still picture or video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or transmitted by using the radio frequency unit 601 or the network module 602. The microphone 6042 may receive a sound and can process such sound into audio data. The processed audio data can be converted into a format output that can be sent to a mobile communications base station through the radio frequency unit 601 in a telephone call mode.

The electronic device 600 further includes at least one sensor 605, for example, a light sensor, a motion sensor, and another sensor. In some implementations, the light sensor includes an ambient light sensor and a proximity sensor. The ambient light sensor may adjust luminance of the display panel 6061 based on brightness of ambient light. The proximity sensor may turn off the display panel 6061 and/or backlight when the electronic device 600 moves close to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for a user. The display unit 606 may include a display panel 6061. The display panel 6061 may be configured in a form of a Liquid Crystal Display (LCD), an Organic Light-Emitting Diode (OLED), or the like.

The user input unit 607 may be configured to: receive input digital or character information, and generate key signal input related to a user setting and function control of the electronic device. In some implementations, the user input unit 607 includes a touch panel 6071 and another input device 6072. The touch panel 6071 is also referred to as a touchscreen, and may collect a touch operation of the user on or near the touch panel 6071 (for example, an operation performed on or near the touch panel 6071 by the user by using any appropriate object or accessory such as a finger or a stylus). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command. In addition, the touch panel 6071 may be implemented in various types such as a resistor, a capacitor, an infrared ray, or a surface acoustic wave. In addition to the touch panel 6071, the user input unit 607 may further include the another input device 6072. In some implementations, the another input device 6072 may include but is not limited to one or more of a physical keyboard, a function key (such as a volume control key or an on/off key), a trackball, a mouse, a joystick, and the like. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. Although the touch panel 6071 and the display panel 6061 in FIG. 15 are configured as two independent components to implement input and output functions of the electronic device, in some embodiments, the touch panel 6071 and the display panel 6061 may be integrated to implement the input and output functions of the electronic device. Details are not limited herein.

The interface unit 608 is an interface for connecting an external apparatus with the electronic device 600. For example, the external apparatus may include a wired or wireless headset port, an external power supply (or battery charger) port, a wired or wireless data port, a storage card port, a port configured to connect to an apparatus having an identification module, an audio Input/Output (I/O) port, a video I/O port, a headset port, and the like. The interface unit 608 may be configured to receive input from an external apparatus (for example, data information and power) and transmit the received input to one or more elements in the electronic device 600, or may be configured to transmit data between the electronic device 600 and the external apparatus.

The memory 609 may be configured to store a software program and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 609 may include a high-speed random access memory, and may further include a nonvolatile memory, for example, at least one magnetic disk storage device, a flash storage device, or another volatile solid-state storage device.

The processor 610 is a control center of the electronic device, connects all parts of the entire electronic device by using various interfaces and lines, and performs various functions of the electronic device and data processing by running or executing a software program and/or a module that are/is stored in the memory 609 and by invoking data stored in the memory 609, to overall monitor the electronic device. The processor 610 can include one or more processing units. In some implementations, the processor 610 may be integrated with an application processor and a modem processor. the present application processor mainly processes an operating system, a user interface, an application, and the like. The modem processor mainly processes wireless communication. It can be understood that the foregoing modem processor may not be integrated into the processor 610.

The electronic device 600 may further include a power supply 611 (such as a battery) supplying power to each component. Preferably, the power supply 611 may be logically connected to the processor 610 by using a power management system, so as to implement functions such as charging management, discharging management and power consumption management by using the power management system.

In addition, the electronic device 600 includes some function modules not shown. Details are not described herein.

An embodiment of this application further provides a readable storage medium. The readable storage medium stores a program or an instruction. When the program or the instruction is executed by a processor, the processes in the foregoing embodiments of the screen control method are implemented, and a same technical effect can be achieved. To avoid repetition, details are not described herein again. Examples of the readable storage medium includes a non-transitory machine-readable storage medium such as a Read-Only Memory (ROM), a Random Access Memory (RAM), a magnetic disk, or an optical disc.

An embodiment of the present application also provides a chip. The chip includes a processor and a communications interface, and the communications interface is coupled to the processor. The processor is configured to run a program or an instruction to implement various processes of the foregoing method embodiment, with the same technical effects achieved. To avoid repetition, details are not described herein again.

It should be understood that the chip mentioned in the embodiments of this application may also be referred to as a system-on-chip, a system chip, a chip system, a system-on-a-chip, or the like.

It should be noted that, in this specification, the terms "include," "comprise," or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

The foregoing describes the aspects of the present invention with reference to flowcharts and/or block diagrams of the method, the apparatus (system), and the computer program product according to the embodiments of the present invention. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It can be further understood that each block in the flowcharts and/or the block diagrams and a combination of blocks in the flowcharts and/or the block diagrams may be alternatively implemented by dedicated hardware that performs a specific function or action, or may be implemented by a combination of dedicated hardware and computer instructions.

Based on the descriptions of the foregoing implementations, a person skilled in the art may clearly understand that the method in the foregoing embodiments may be implemented by software in addition to a necessary universal hardware platform or by hardware only. In most circumstances, the former is a preferred implementation. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations, and the foregoing specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A screen control method, performed by a first electronic device, wherein the method comprises:
when a screen of multi-party video communication is displayed, receiving a first input by a first user;
in response to the first input, establishing a first communication connection between the first electronic device and a second electronic device corresponding to the first input;
receiving an inquiry request sent by the second electronic device, wherein the inquiry request is used to inquire whether to establish a second communication connection with a third electronic device, and the inquiry request comprises an identifier of the third electronic device;
when a determination input of the inquiry request by the first user is received, disconnecting the first communication connection with the second electronic device, and establishing the second communication connection with the third electronic device,
wherein the first electronic device, the second electronic device, and the third electronic device are electronic devices participating in the multi-party video communication, and wherein the first communication connection or the second communication connection is used for the second electronic device or the third electronic device to send a control instruction for controlling a screen display content of the first electronic device; and
when the control instruction is received, performing a control operation corresponding to the control instruction on the screen display content of the first electronic device.

2. The method according to claim 1, wherein after the establishing a first communication connection between the first electronic device and a second electronic device corresponding to the first input, the method further comprises:
when it is detected that the second electronic device is disconnected from the first communication connection, disconnecting the first communication connection with the second electronic device.

3. The method according to claim 1, wherein after the establishing a first communication connection between the first electronic device and a second electronic device corresponding to the first input, the method further comprises:
receiving a second input by the first user; and
in response to the second input, disconnecting the first communication connection with the second electronic device.

4. The method according to claim 1, further comprising:
receiving gesture information sent by a fourth electronic device, wherein the fourth electronic device is a device other than the first electronic device among the devices participating in the multi-party video communication;
displaying the gesture information sent by each of the fourth electronic device according to a chronological order of receiving the gesture information;
receiving a third input by the first user on target gesture information in the gesture information; and
in response to the third input, starting a speaking function of a target fourth electronic device corresponding to the target gesture information.

5. The method according to claim 4, further comprising:
when the first electronic device displays a speaking order list of a user of each of the fourth electronic device, after a target fourth electronic device whose speaking function is in an activated state turns off the speaking function, sending first prompt information to a fourth electronic device behind the target fourth electronic device in the speaking order list,
wherein the first prompt information is used to instruct the fourth electronic device behind the target fourth electronic device to start the speaking function.

6. A screen control method, performed by a second electronic device, wherein the method comprises:
when a screen of multi-party video communication is displayed, receiving a control operation by a second user on the second electronic device, wherein electronic devices participating in the multi-party video communication at least comprise a first electronic device, the second electronic device, and a third electronic device; and when a first communication connection is established between the second electronic device and the first electronic device, receiving a fifth input by the second user; and in response to the fifth input, sending an inquiry request to the first electronic device, wherein the inquiry request comprises an identifier of the third electronic device, so that when a determination input of the inquiry request by the first user is received, the first electronic device disconnects the first communication connection with the second electronic device, and establishes the second communication connection with the third electronic device, wherein the first communication connection or the second communication connection is used for the second electronic device and the third electronic device to transmit the control instruction for controlling a screen display content of the first electronic device.

7. The method according to claim 6, further comprising:
when the first communication connection is established between the second electronic device and the first electronic device, receiving a fourth input by the second user; and in response to the fourth input, disconnecting the first communication connection with the first electronic device.

8. An electronic device, comprising:
a memory storing computer-readable instructions; and
a processor coupled to the memory and configured to execute the computer-readable instructions, wherein the computer-readable instructions, when executed by the processor, cause the processor to perform operations comprising:
when a screen of multi-party video communication is displayed, receiving a first input by a first user;
in response to the first input, establishing a first communication connection between a first electronic device and a second electronic device corresponding to the first input,
receiving an inquiry request sent by the second electronic device, wherein the inquiry request is used to inquire whether to establish a communication connection with a third electronic device, and the inquiry request comprises an identifier of the third electronic device;
when a determination input of the inquiry request by the first user is received, disconnecting the first communication connection with the second electronic device, and establishing a second communication connection with the third electronic device;
wherein the electronic device comprises the first electronic device, the second electronic device, and the third electronic device participating in the multi-party video communication, and wherein the first communication connection or the second communication connection is used for the second electronic device or the third electronic device to send a control instruction for controlling a screen display content of the first electronic device; and
when the control instruction is received, performing a control operation corresponding to the control instruction on the screen display content of the first electronic device.

9. The electronic device according to claim 8, wherein after the establishing a first communication connection between the first electronic device and a second electronic device corresponding to the first input, the operations further comprise:
when it is detected that the second electronic device is disconnected from the first communication connection, disconnecting the first communication connection with the second electronic device.

10. The electronic device according to claim 8, wherein after the establishing a first communication connection between the first electronic device and a second electronic device corresponding to the first input, the operations further comprise:
receiving a second input by the first user; and
in response to the second input, disconnecting the first communication connection with the second electronic device.

11. The electronic device according to claim 8, wherein the operations further comprise:
receiving gesture information sent by a fourth electronic device, wherein the fourth electronic device is a device other than the first electronic device among the devices participating in the multi-party video communication;
displaying the gesture information sent by each of the fourth electronic device according to a chronological order of receiving the gesture information;
receiving a third input by the first user on target gesture information in the gesture information; and
in response to the third input, starting a speaking function of a target fourth electronic device corresponding to the target gesture information.

12. The electronic device according to claim 11, wherein the operations further comprise:
when the first electronic device displays a speaking order list of a user of each of the fourth electronic device, after a target fourth electronic device whose speaking function is in an activated state turns off the speaking function, sending first prompt information to a fourth electronic device behind the target fourth electronic device in the speaking order list,
wherein the first prompt information is used to instruct the fourth electronic device behind the target fourth electronic device to start the speaking function.

13. An electronic device, comprising:
a memory storing computer-readable instructions; and
a processor coupled to the memory and configured to execute the computer-readable instructions, wherein the computer-readable instructions, when executed by the processor, cause the processor to perform operations comprising:
when a screen of multi-party video communication is displayed, receiving a control operation by a second user on a second electronic device, wherein electronic devices participating in the multi-party video communication at least comprise a first electronic device, the second electronic device, and a third electronic device;
when a first communication connection is established between the second electronic device and the first electronic device, receiving a fifth input by the second user; and
in response to the fifth input, sending an inquiry request to the first electronic device, wherein the inquiry request comprises an identifier of the third electronic device, so that when a determination input of the inquiry request by the first user is received, the first electronic device disconnects the first communication connection with the second electronic device, and establishes the second communication connection with the third electronic device, wherein the first communication connection or the second communication connection is used for the second electronic device and the third electronic device to transmit the control instruction for controlling a screen display content of the first electronic device.

14. The electronic device according to claim 13, wherein the operations further comprise:
   when the first communication connection is established between the second electronic device and the first electronic device, receiving a fourth input by the second user; and
   in response to the fourth input, disconnecting the first communication connection with the first electronic device.

* * * * *